L. Jennings,
Bucket,

Nº 11,789. Patented Oct. 10, 1854.

UNITED STATES PATENT OFFICE.

LYMAN JENNINGS, OF ERVING, MASSACHUSETTS.

IMPROVEMENT IN CANS FOR HOLDING LIQUIDS.

Specification forming part of Letters Patent No. 11,789, dated October 10, 1854.

*To all whom it may concern:*

Be it known that I, LYMAN JENNINGS, of Erving, of the county of Franklin and State of Massachusetts, have invented an Improved Can for Holding Molasses, Milk, or other Liquids, of which the following is a full, clear, and exact description, reference being had to the annexed drawings, making part of this specification, in which—

Figure 1:
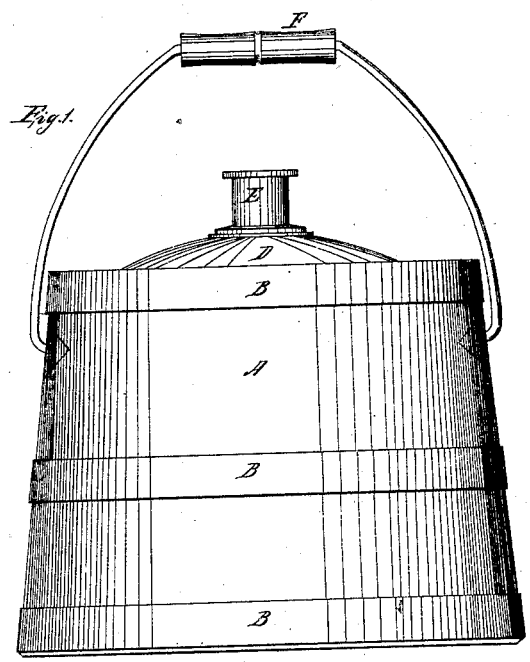
Figure 2:
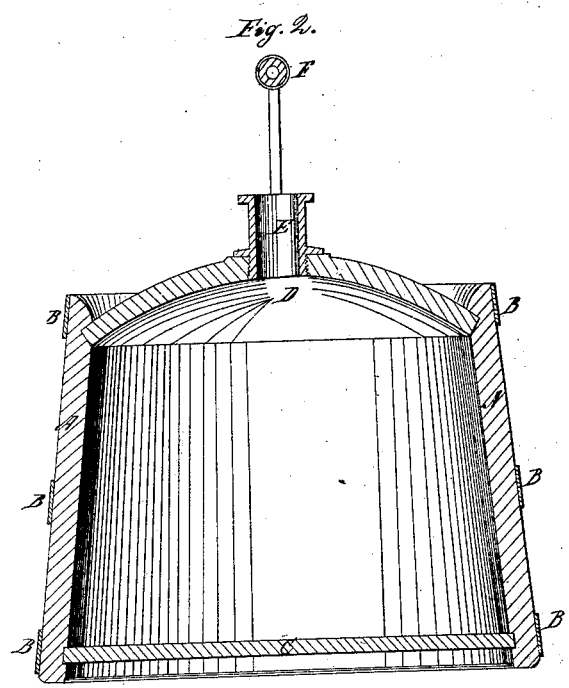

Figure 1 is a view of the can; Fig. 2, a section through the same.

My improved can is designed to replace the stone jug and tin can now in use for holding molasses and milk. The jug, as is well-known, is objectionable on account of its extreme liability to breakage, by which both the receptacle and its contents are lost; and the tin can soon becomes bruised and blackened, so that preference is given by both milkmen and housekeepers to vessels of wood, whenever they can be used. There is, however, nothing at present made of wood which can replace the jug and tin can except the common keg, and this is entirely unsuited to the required purpose, for if the nozzle or bung-hole be placed, as in a barrel, in the center of one of the staves, the keg, when set down, rolls about, and its contents may be spilled; and if the nozzle be put in one of the heads of the keg, then it can never be thoroughly emptied or drained, as the liquid will remain in the joint between the head and stave; and thus a keg of this form is entirely unsuited to the purpose of carrying milk, as it is very requisite that milk-cans shall have a perfect drainage; otherwise it is imposible to keep them sweet and clean. To remedy this inconvenience I have contrived the subject of my present invention, which may be described as follows:

A is the can, which is composed of staves held together by hoops B. C is the lower head; D, the upper one. The latter, instead of being flat, is made convex, as seen in Fig. 2. E is a metallic spout screwed into the central part of the upper head, the plug or cork being inserted into the said spout. F is the bail, which is affixed to the can in a manner similar to that in which the bail is secured to the ordinary water-bucket.

A vessel of this description cannot be broken like the jug or bruised like the tin can, while at the same time the peculiar form of its head enables it to be emptied entirely of its contents and be thoroughly drained after being washed, which cannot be effected with the ordinary flat-headed keg, while the adaptation of the handle renders it as portable and as easily handled as the jug or tin can.

I do not claim the adaptation of a handle to this or any other form of vessel; neither do I claim making a keg for containing liquids of wood, as this has been done before; but What I do claim as my invention, and desire to secure by Letters Patent, as a new article for containing milk and other liquids, is—

The above-described wooden can, having its upper head convex, and being furnished with a handle, in the manner described, and for the purpose set forth.

LYMAN JENNINGS.

Witnesses:
R. D. CHASE,
GEO. A. WHIPPLE.